No. 621,176. Patented Mar. 14, 1899.
J. C. SUMMERS.
HAY RAKE AND LOADER.
(Application filed Dec. 8, 1898.)
(No Model.) 2 Sheets—Sheet 1.
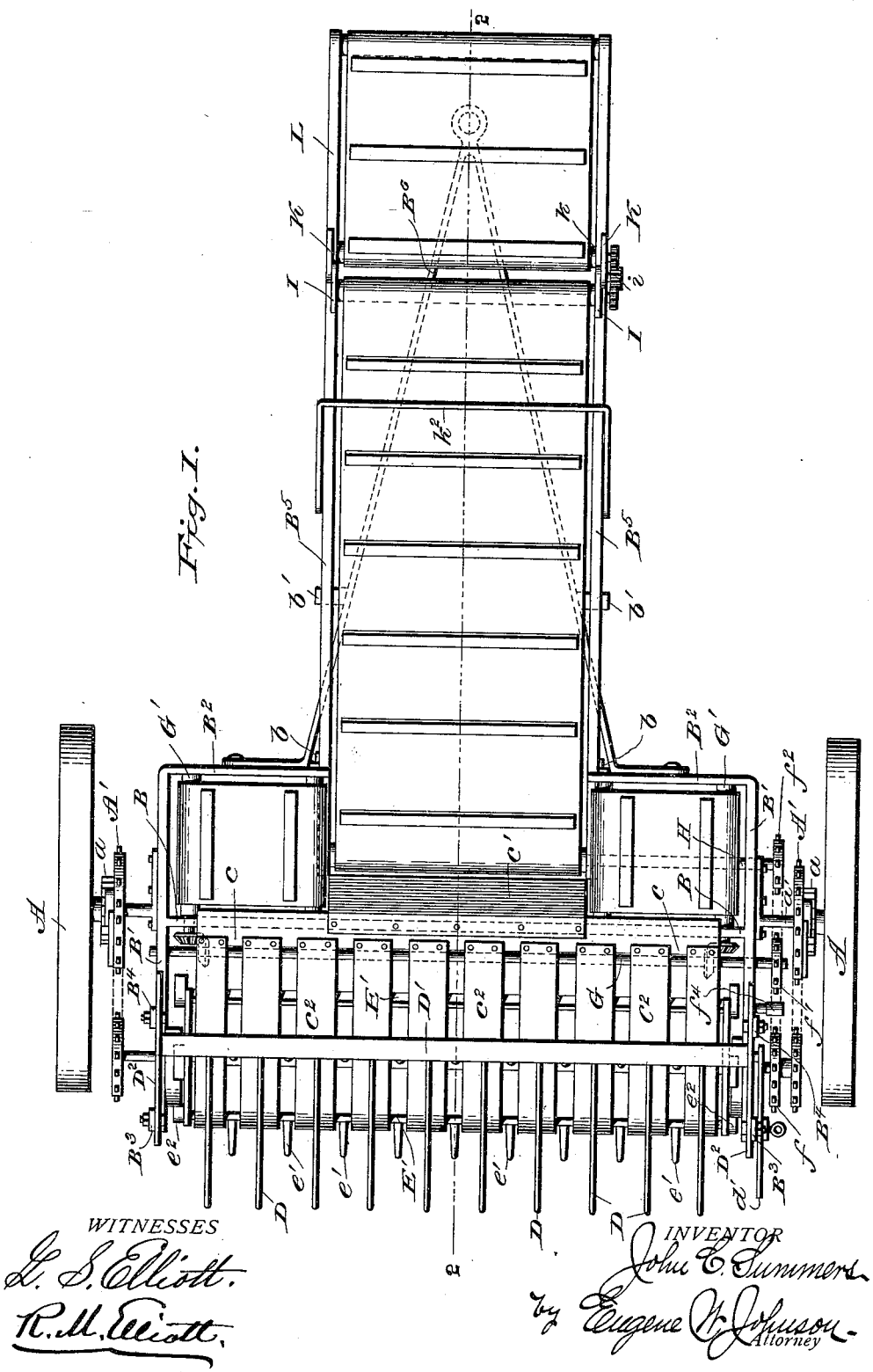

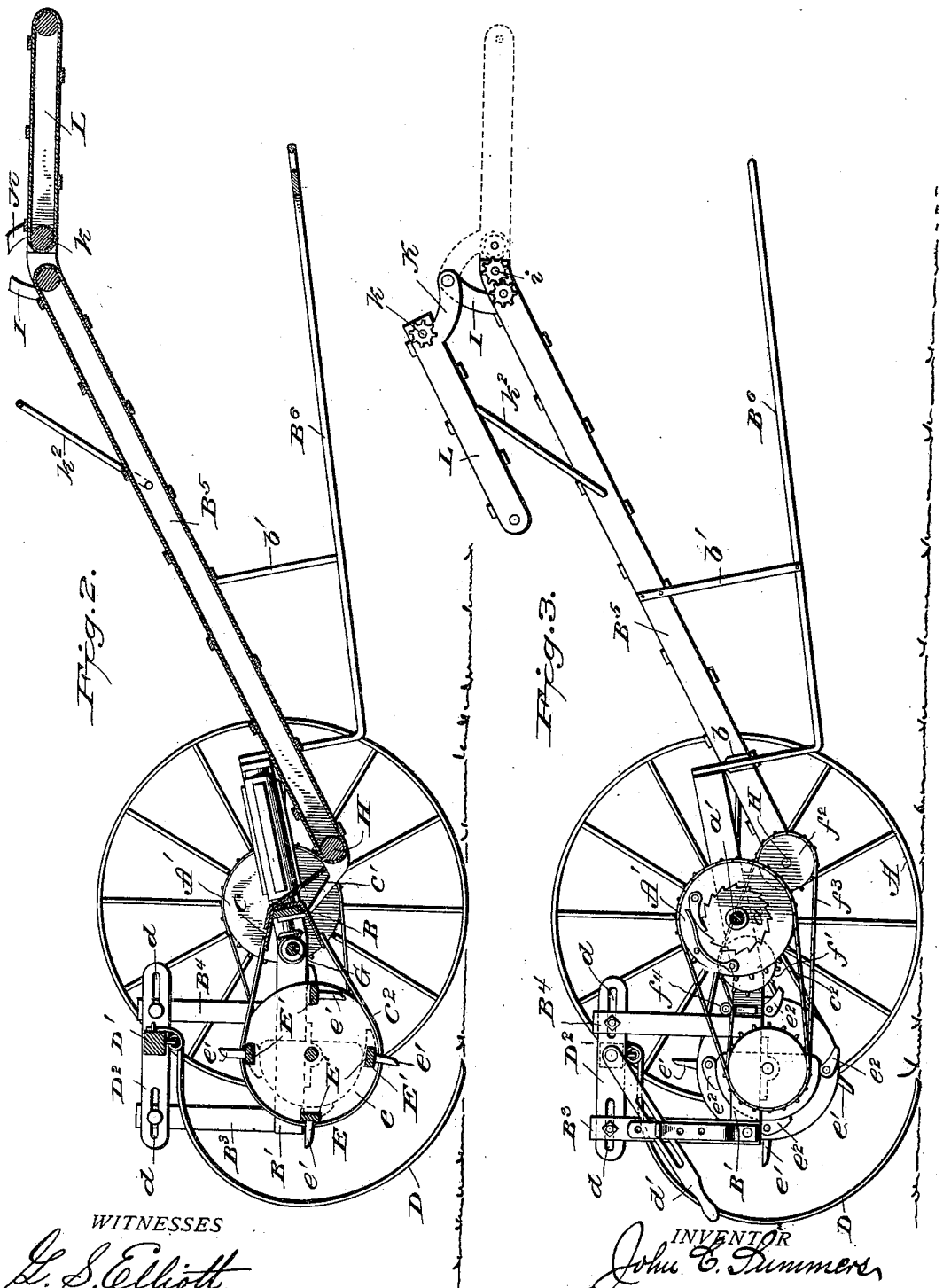

UNITED STATES PATENT OFFICE.

JOHN C. SUMMERS, OF MOUNT HOPE, OHIO.

HAY RAKE AND LOADER.

SPECIFICATION forming part of Letters Patent No. 621,176, dated March 14, 1899.

Application filed December 8, 1898. Serial No. 698,674. (No model.)

*To all whom it may concern:*

Be it known that I, JOHN C. SUMMERS, a citizen of the United States, residing at Mount Hope, in the county of Holmes and State of Ohio, have invented new and useful Improvements in Hay Rakes and Loaders, of which the following is a specification.

This invention relates to certain new and useful improvements in hay rakes and loaders, the object of my invention being to provide a simple, cheap, and effective hay rake and loader which can be readily attached to a wagon, so that when said wagon is drawn across the field the hay will be gathered and loaded into the wagon.

The particular features of my invention reside in the novel construction and arrangement of the frame of the machine, whereby great rigidity and lightness are attained, as will be hereinafter set forth, and specifically pointed out in the claims.

In the accompanying drawings, which illustrate my invention, Figure 1 is a plan view. Fig. 2 is a longitudinal sectional view on the line 2 2 of Fig. 1, and Fig. 3 is a side elevation with the near drive-wheel removed.

The supporting and drive wheels A A have attached to the hubs thereof ratchet-disks $aa$, the hubs and disks turning loosely on stub-axles $a'$, which axles carry sprocket-wheels A', having spring-actuated pawls arranged to engage the ratchet-disks, so that the sprocket-wheels will turn with the supporting-wheels as the machine is drawn forward, but will remain idle when the machine is backed.

The main frame of the hay rake and loader is constructed of flat or angle bars of metal arranged so as to present a cross-bar B and bars B', which extend both rearward and forward of the cross-bar, the forward members of the bars B' being bent toward each other and parallel with the bar B, said members $B^2$ having attached at their ends hangers $b$. The stub-axles $a'$ are bolted or otherwise secured to the members B' of the frame, and the rear portions of said members have attached thereto shaft-bearings, a cam-plate, and on opposite sides of the shaft-bearings standards $B^3 B^4$.

To the hangers $b\ b$ are attached bars $B^5$, the rear ends of which are bent upwardly and secured to the cross-bar B. Between the bars $B^5$ is located the carrier-belt, and said bars are connected to a draft-bar $B^6$ by rods $b'$, the draft-bar being bent upward and attached to the bars $B^2$ of the main frame. The forward portion of the draft-bar is bent so as to provide an eye, through which may be passed a coupling-pin for connecting the hay rake and loader to the running-gear of a hay-wagon.

The frame constructed as hereinbefore set forth can be cheaply made, the parts can be welded or bolted together, giving thereto great rigidity, the parts thereof are so organized that there can be attached or formed therethrough shaft-bearings of the simplest type, and the inherent rigidity of the frame prevents the several shafts and gears employed from being thrown out of alinement, accomplishing in a simple manner a requirement essential in this type of farm machinery.

To the cross-bar B is secured a sheet-metal plate $c$, having openings therethrough for the passage of the rear ends of the bars $B^5$, which are connected to the rear face of the bar B. The metal plate $c$ carries a deflecting-plate $c'$ and a series of strips or loops $c^2$, which constitute a reel-casing, space being provided between the strips through which the fingers or teeth of the reel may project.

The rake-teeth D are connected to a rock-shaft D', which is journaled between bars or supports $D^2$, said bars having therethrough slots $d\ d$ for the passage of bolts, which connect the bars $D^2$ to the standards $B^3 B^4$, and to one end of the rock-shaft which carries the rake-teeth is secured a lever $d'$, which is slotted for the passage of a locking-pin which holds the lever in a fixed position. By the construction shown the rake can be adjusted to occupy a proper position with respect to the reel and condition of the crop to be gathered, and, if desirable, the rake-teeth may be positioned at an angle with the reel, so as to overcome any tendency of the hay to gather unduly at one end of the rake, which may be caused by wind or inequalities of the ground, as when gathering hay upon a hillside.

The shaft upon which is mounted the reel E is carried by bearings attached to the bars B' B', and said shaft has attached circular disks $e\ e$, in which are journaled bars E', to which are rigidly attached fingers $e'$, which elevate the hay gathered by the rake and deposit it upon the reel-casing, from whence it is delivered to the carrier-belts. The fingered bars have at their ends arms $e^2$, which are positioned at substantially right angles with the fingers or teeth $e'$, said arms engaging with a cam rigidly attached to the frame, and when the arms are in engagement therewith they position the teeth or fingers of the reel so that they will project beyond the reel-casing and engage, so as to elevate the hay gathered by the rake. When the arms attached to the ends of the fingered bars leave the cam, the fingers or teeth will fall to a vertical position within the reel-casing and will be entirely freed from the hay.

The reel-shaft has thereon sprocket-wheels and is driven by a chain which passes over the sprocket-wheels $A'$ on the stub-shaft $a'$.

In order that there may be a uniformity of motion or speed between the reel and the carrier-belts, I drive the carrier-belts directly from the reel-shaft, and with said end in view the reel-shaft has attached thereto a sprocket-wheel $f$, which is in gear with sprocket-wheels $f'$ $f^2$, attached to the ends of shafts G H, which are the driving-shafts of the carrier-belts. The sprocket-wheels $f$ $f'$ $f^2$ are connected by a chain $f^3$, and, if desirable, a chain-adjuster or take-up $f^4$ may be provided and when used it will consist of a bent arm which projects from the frame, so that it may be turned upon the frame to bring a roller carried by the end of the arm in engagement with the sprocket-chain, suitable means being provided for holding the arms in place, which means may be a lock-nut.

The shaft G, which carries the sprocket-wheel $f'$, is journaled in the side pieces $B'$ of the frame rear of the cross-bar B, and it has mounted thereon pinions which mesh with similar pinions or miter-gears on the shafts $G'$, which support the driven rollers of the lateral delivery-belts, the opposite end rollers being also journaled in the cross-bar B and in the end members $B^2$ of the frame. The shaft H, which drives the main carrier-belt, is journaled in the lower portion of the supporting-bars $B^5$, and said belt drives a roller located near the upper ends of said bars, said roller carrying a pinion beyond the side bar, which meshes with a pinion $i$, mounted loosely on a supporting stub-shaft which projects from one of the bars.

To the ends of the bars $B^5$ are rigidly secured arms I, to which are secured similar arms K, of an extension-carrier L, and said carrier is so constructed that when desired for use it may be swung into an operative position, as shown in full lines in Fig. 1 and in dotted lines in Fig. 3, and when in such position the pinion thereof, which is mounted on the roller $k$, will mesh with the pinion $i$ to drive the extension-belt. The extension-belt is used to deliver the hay to the front part of a wagon, and when that part has been loaded the extension-carrier may be thrown back, as shown in full lines in Fig. 3, and will rest upon a bail or support $k^2$. The ends of the side bars $B^5$ are cut at an angle, as well as the ends of the side bars of the extension-carrier, so that the extension-carrier when in an operative position will be substantially horizontal.

In operation the rake, after being properly adjusted, is made fast by securing the lever in a locked position upon the standard $B^3$, and when the hay rake and loader is made fast to a wagon and the wagon is drawn across the field the hay will be gathered by the rake and, being crowded upward, engages with the reel-teeth, it being taken from the rake and forced forward on the reel-casing. The center portion of the hay falling on the deflector-plate is deposited upon the main or central carrier-belt. The other portion, being fed upon the lateral carriers, is carried to the main carrier, which deposits the hay either upon the extension thereof or directly into the wagon.

It will be noted that the lateral carrier-belts have a slight inclination, which will prevent the hay being crowded over the same before it has time to be taken by said belts to the main carrier, and should any hay be forced over the front edge of said carrier-belts it will be gathered by the rake which is rear thereof.

Numerous changes may be made without departing from my invention.

What I claim as new, and desire to secure by Letters Patent, is—

1. In a hay rake and loader, the combination of a frame comprising a cross-bar, side bars connected thereto, the forward portions of the side bars being bent inward to lie parallel with the cross-bar, a carrier-frame attached to the cross-bar and to hangers carried by the terminals of the inward-bent bars, a pair of lateral carrying-belts mounted on shafts journaled to the cross-bar and the bars parallel therewith, a driving-shaft for said shafts journaled in the frame parallel with the cross-bar thereof, a reel mounted on a shaft journaled in bearings carried by the rear portion of the frame, an endless carrier-belt which engages with a shaft journaled in the frame thereof, said shafts being driven from the reel-shaft, substantially as shown.

2. A hay rake and loader comprising a rigid frame constructed substantially as shown and provided with a cross-bar, a strip bent so as to lie over and under the cross-bar, a deflecting-plate secured centrally to the strip so as to depend therefrom, a series of strips secured to the rearwardly-projecting members of the strip which embraces the cross-bar and a reel located within said strips; together with a rake and carrier-belts organized substantially as shown.

In testimony whereof I have hereunto set my hand in presence of two subscribing witnesses.

JOHN C. SUMMERS.

Witnesses:
W. S. HANNA,
J. B. LEEPER.